US008531744B2

(12) United States Patent
Adachi

(10) Patent No.: US 8,531,744 B2
(45) Date of Patent: Sep. 10, 2013

(54) IMAGE DEFECT DIAGNOSTIC SYSTEM, IMAGE FORMING APPARATUS, IMAGE DEFECT DIAGNOSTIC METHOD AND COMPUTER READABLE MEDIUM

(75) Inventor: Koji Adachi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 737 days.

(21) Appl. No.: 12/726,994

(22) Filed: Mar. 18, 2010

(65) Prior Publication Data

US 2011/0019245 A1 Jan. 27, 2011

(30) Foreign Application Priority Data

Jul. 21, 2009 (JP) ................................ 2009-170631

(51) Int. Cl.
*H04N 1/46* (2006.01)
(52) U.S. Cl.
USPC .......... 358/504; 358/1.13; 358/1.14; 358/1.9; 358/3.26; 358/448; 358/474; 358/518; 382/112; 382/117; 382/132; 382/167; 382/274
(58) Field of Classification Search
None
See application file for complete search history.

(56) References Cited

U.S. PATENT DOCUMENTS

| | | | | |
|---|---|---|---|---|
| 6,377,758 | B1 * | 4/2002 | OuYang et al. | 399/15 |
| 7,302,091 | B2 * | 11/2007 | Hamaguchi et al. | 382/145 |
| 7,440,605 | B2 * | 10/2008 | Sasa et al. | 382/141 |
| 7,676,703 | B2 * | 3/2010 | Uwatoko et al. | 714/48 |
| 7,965,414 | B2 * | 6/2011 | Wu et al. | 358/1.9 |
| 8,126,258 | B2 * | 2/2012 | Yang et al. | 382/145 |
| 8,208,747 | B2 * | 6/2012 | Hirose et al. | 382/262 |
| 2001/0035889 | A1 | 11/2001 | Mikami | |
| 2003/0142985 | A1 * | 7/2003 | Sampath et al. | 399/9 |
| 2004/0066962 | A1 * | 4/2004 | Sasa et al. | 382/141 |
| 2006/0067569 | A1 | 3/2006 | Haga | |
| 2006/0067571 | A1 * | 3/2006 | Onishi | 382/149 |
| 2006/0110009 | A1 * | 5/2006 | Klassen et al. | 382/112 |
| 2007/0041060 | A1 | 2/2007 | Kikuchi et al. | |
| 2007/0237529 | A1 * | 10/2007 | Katou | 399/9 |
| 2010/0020361 | A1 * | 1/2010 | Kim et al. | 358/406 |
| 2010/0124362 | A1 * | 5/2010 | Wu et al. | 382/112 |

FOREIGN PATENT DOCUMENTS

| | | |
|---|---|---|
| JP | A-10-255036 | 9/1998 |
| JP | A-2001-310535 | 11/2001 |
| JP | A-2002-283681 | 10/2002 |

(Continued)

OTHER PUBLICATIONS

Jun. 11, 2013 Office Action issued in Japanese Patent Application No. 2009-170631 (with translation).

*Primary Examiner* — Dung Tran
(74) *Attorney, Agent, or Firm* — Oliff & Berridge, PLC

(57) ABSTRACT

An image defect diagnostic system includes: a memory that stores an image density threshold set for each of partial regions in a test target image being a test target for an image defect and set as a criteria for judging whether or not each of the partial regions has an image defect, and that stores a positional information piece indicating a position of corresponding one of the partial regions in the test target image, while associating the image density threshold and the positional information piece with each other; and a diagnostic unit that compares an image data piece of each of the partial regions generated by scanning the test target image with the image density threshold set for corresponding one of the partial regions stored in the memory, to diagnose whether or not an image defect occurs in the test target image.

11 Claims, 13 Drawing Sheets

(56) References Cited

FOREIGN PATENT DOCUMENTS

| | | |
|---|---|---|
| JP | A-2004-180000 | 6/2004 |
| JP | A-2006-98217 | 4/2006 |
| JP | A-2007-059990 | 3/2007 |
| JP | A-2008-225377 | 9/2008 |

* cited by examiner

FIG.10

DISPLAY SCREEN

PLEASE SELECT A DIAGNOSIS RESULT

| ESTIMATED FAILURE CAUSES AND FAILURE PARTS | FAILURE PROBABILITY | OPERATION DIFFICULTY LEVELS |
|---|---|---|
| ☐ DIRT ON PLATEN GLASS | 98.5% | LEVEL 1 |
| ☐ LIGHT-UP ERROR OF PHOTORECEPTOR GHOST ELIMINATION LAMP | 0.2% | LEVEL 2 |
| ☐ WIRING SUBSTRATE ERROR OF SCANNER / IMAGE FORMING PART | 0.2% | LEVEL 3 |
| ☐ PAGE MEMORY ERROR | 0.1% | LEVEL 3 |

OK    RETURN    CANCEL

US 8,531,744 B2

IMAGE DEFECT DIAGNOSTIC SYSTEM, IMAGE FORMING APPARATUS, IMAGE DEFECT DIAGNOSTIC METHOD AND COMPUTER READABLE MEDIUM

CROSS REFERENCE TO RELATED APPLICATIONS

This application is based on and claims priority under 35 USC §119 from Japanese Patent Application No. 2009-170631 filed Jul. 21, 2009.

BACKGROUND

1. Technical Field

The present invention relates to an image defect diagnostic system, an image forming apparatus, an image defect diagnostic method and a computer readable medium storing a program.

2. Related Art

There has been known a technique in which an image forming apparatus such as a copy machine, a printer or the like estimates a failure part. Specifically, in the image forming apparatus, a test chart (test target image) printed by itself is scanned by an image scanner apparatus, and image defects are diagnosed on the basis of the scanned image data of the test target image, and then the failure part of the image forming apparatus is estimated on the basis of the occurrence state of the image defects.

SUMMARY

According to an aspect of the present invention, there is provided an image defect diagnostic system including: a memory that stores an image density threshold set for each of partial regions in a test target image being a test target for an image defect and set as a criteria for judging whether or not each of the partial regions has an image defect, and that stores a positional information piece indicating a position of corresponding one of the partial regions in the test target image, while associating the image density threshold and the positional information piece with each other; and a diagnostic unit that compares an image data piece of each of the partial regions generated by scanning the test target image with the image density threshold set for corresponding one of the partial regions stored in the memory, to diagnose whether or not an image defect occurs in the test target image.

BRIEF DESCRIPTION OF THE DRAWINGS

An exemplary embodiment of the present invention will be described in detail based on the following figures, wherein:

FIG. 10 is a view showing an example of a display screen for a diagnosis result displayed on the operation display;

DETAILED DESCRIPTION

An exemplary embodiment of the present invention will be described below in detail with reference to the accompanying drawings.

<Description of Image Forming Apparatus>

Figure 1:
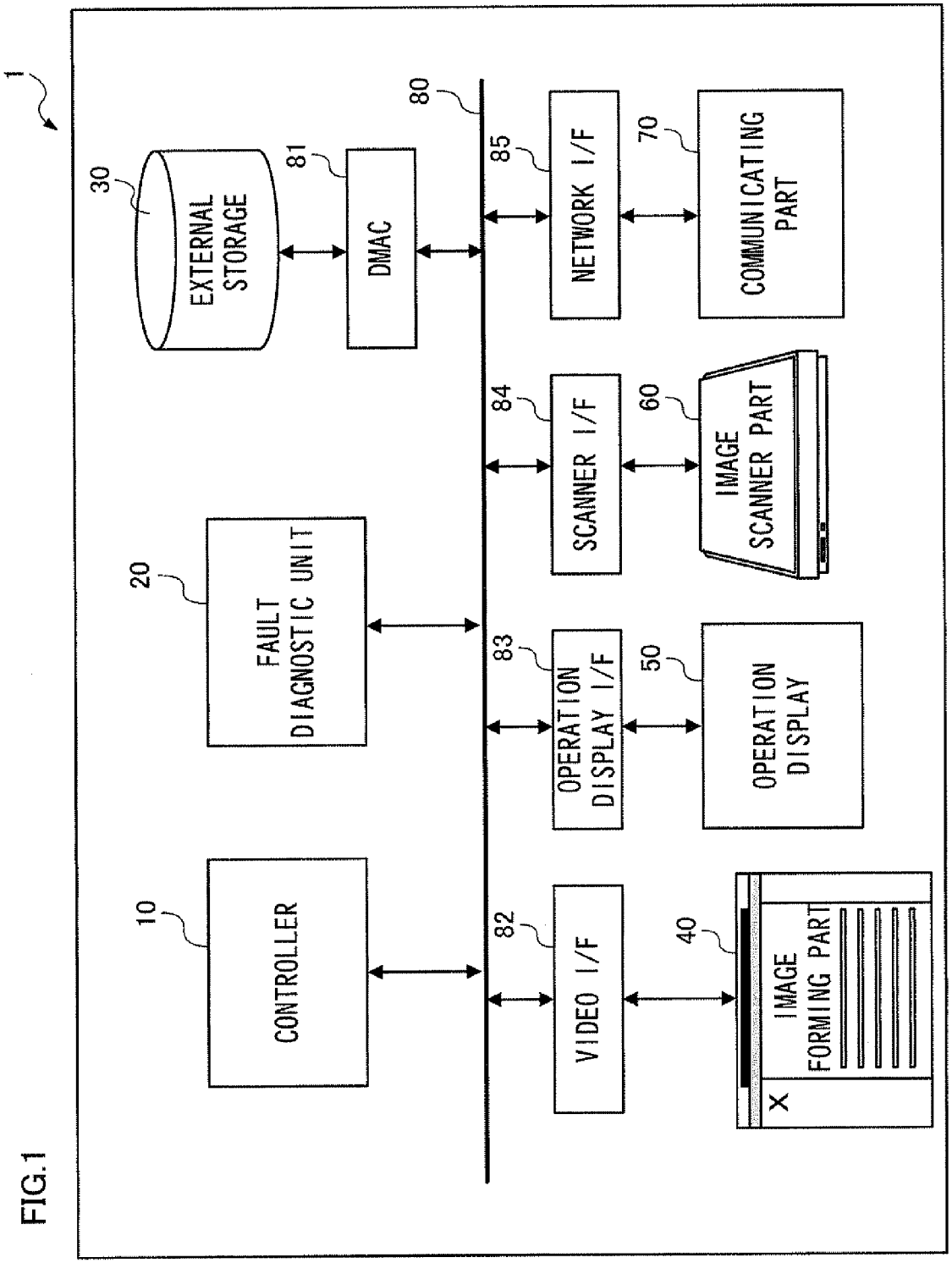
FIG. 1 is a block diagram showing an example of a configuration of an entire image forming apparatus to which the exemplary embodiment is applied.

FIG. 1 is a block diagram showing an example of a configuration of an entire image forming apparatus 1 to which the exemplary embodiment is applied. The image forming apparatus 1 shown in FIG. 1 includes a controller 10, a fault diagnostic unit 20 and an external storage 30. The controller 10 controls entire operation of the image forming apparatus 1. The fault diagnostic unit 20 is an example of an image defect diagnostic unit that diagnoses a failure of the image forming apparatus 1 on the basis of an image defect occurring in an image. The external storage 30 is formed of a hard disk drive (HDD), a flash memory or the like, for example, and stores various kinds of programs, data and the like.

The image forming apparatus 1 further includes an image forming part 40, an operation display 50, an image scanner part 60 and a communicating part 70. The image forming part 40 is an example of an image forming unit that forms an image on a recording medium (sheet) on the basis of image data (video data). The operation display 50 is an example of a receiving unit that receives an operation input from a user, and displays various kinds of information to the user. The image scanner part 60 is an example of an image scanner unit that scans the reflectance of each color component from an original image, and thereby generates image data (image data pieces). The communicating part 70 communicates with a communication unit (network) such as a local area network (LAN), a wide area network (WAN) or the Internet. Here, as the image forming part 40, an electrophotographic image forming engine is used, for example.

Furthermore, the image forming apparatus 1 includes a direct memory access controller (DMAC) 81, a video interface (I/F) 82, an operation display interface (I/F) 83, a scanner interface (I/F) 84 and a network interface (I/F) 85. The DMAC 81 performs data transfer to and from the external storage 30 at a high speed. The video I/F 82 controls video data transmission and reception to and from the image forming part 40. The operation display I/F 83 controls data transmission and reception to and from the operation display 50. The scanner I/F 84 controls image data transmission and reception to and from the image scanner part 60. The network I/F 85 controls data transmission and reception to and from the communicating part 70.

The controller 10, the fault diagnostic unit 20, the video I/F 82, the operation display I/F 83, the scanner I/F 84 and the network I/F 85 are connected to a peripheral components interconnect (PCI) bus 80.

Moreover, the external storage 30 is connected to the PCI bus 80 through the DMAC 81, and performs high-speed data transfer to and from the controller 10 and various interfaces (I/Fs) connected to the PCI bus 80.

Here, the fault diagnostic unit 20 may be formed integrally with the controller 10, the image forming part 40, the image scanner part 60 and the like, or may be formed separately therefrom. When being formed separately, the fault diagnostic unit 20 is connected to the controller 10, the image forming part 40, the image scanner part 60 and the like through the communicating part 70 by a network such as a LAN, a WAN or the Internet, for example. In this way, a fault diagnostic system including the fault diagnostic unit 20 outside the image forming apparatus 1 is formed. A communication line forming the network may be a telephone line, a satellite communication line (a space transmission path in digital satellite broadcasting, for example) or the like.

<Description of Fault Diagnostic Unit>

Figure 2:
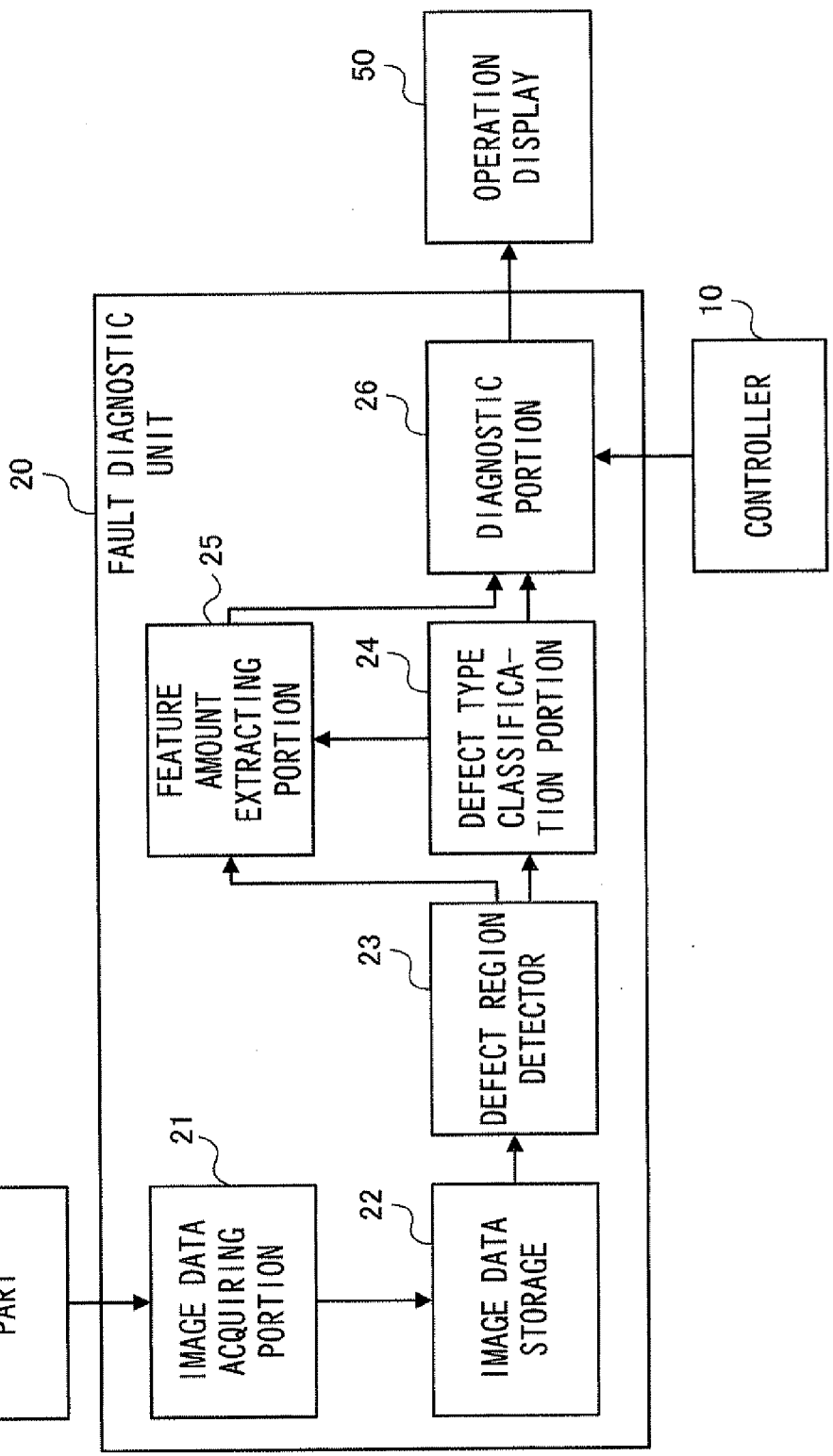
FIG. 2 is a block diagram for explaining a configuration of the fault diagnostic unit.

FIG. 2 is a block diagram for explaining a configuration of the fault diagnostic unit 20.

As shown in FIG. 2, the fault diagnostic unit 20 includes an image data acquiring portion 21, an image data storage 22, a defect region detector 23, a defect type classification portion 24, a feature amount extracting portion 25 and a diagnostic portion 26. The image data acquiring portion 21 acquires the image data generated by the image scanner part 60. The image data storage 22 stores the image data acquired by the image data acquiring portion 21. The defect region detector 23 detects each region, having an image defect, of an image (hereinafter called a "defect region"). The defect type classification portion 24 classifies types of defects occurring in the image. The feature amount extracting portion 25 extracts feature amounts of the defects from the defect regions of the image. The diagnostic portion 26 diagnoses a failure cause bringing about the image defects, by using information on the types of the defects occurring in the image, the feature amounts of the defects extracted from the defect regions, and the like.

<Description of Acquiring Image Data to be Used for Fault Diagnosis by Fault Diagnostic Unit>

The image data acquiring portion 21 acquires image data on a test chart selected by a user (a user, an administrator or the like of the image forming apparatus 1, for example) operating the operation display 50. This test chart is selected by the user making a selection on the operation display 50 on the basis of defect occurrence conditions such as an occurrence state of each image defect to be diagnosed and a color with which each image defect is occurring.

Figure 3:
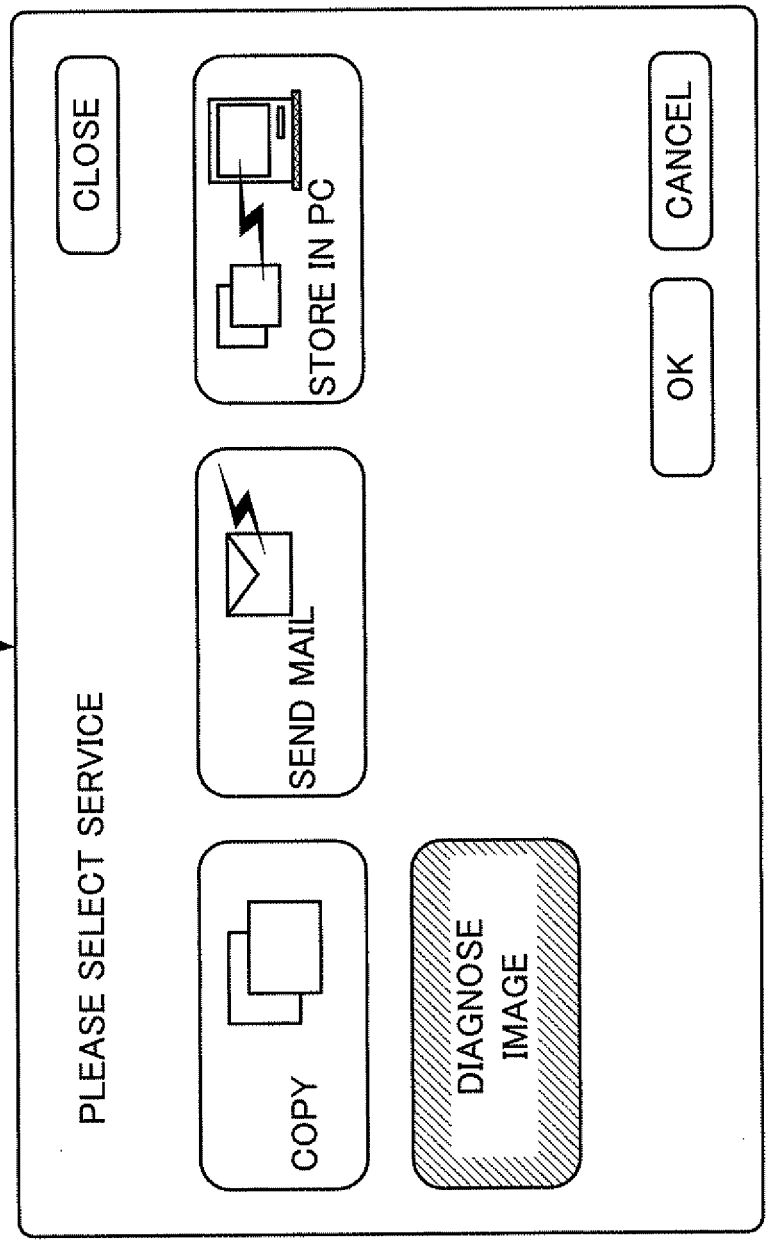
FIG. 3 is a view showing an example of the display screen for the contents of service displayed by the operation display.

Specifically, for example, when a main switch (not shown) of the image forming apparatus 1 is turned on, the controller 10 transmits, to the operation display 50 through the operation display I/F 83, a control signal for instructing the operation display 50 to display the contents of service to be provided to the user. Upon receipt of the signal, the operation display 50 displays a display screen showing the contents of service to be provided to the user by the image forming apparatus 1, as shown in FIG. 3 (which is a view showing an example of the display screen for the contents of service displayed on the operation display 50). In this display screen, displayed is, for example, a screen including: "copy" for executing a copy function; "send mail" for executing a function of sending a mail; "store in PC" for executing a function of storing, in a personal computer (PC), the image data scanned by the image scanner part 60; and "diagnose image" for executing a function of diagnosing a failure cause bringing about the image defects. Additionally, the operation display 50 also displays an instruction comment for instructing the user to select any of these functions.

Figure 4:
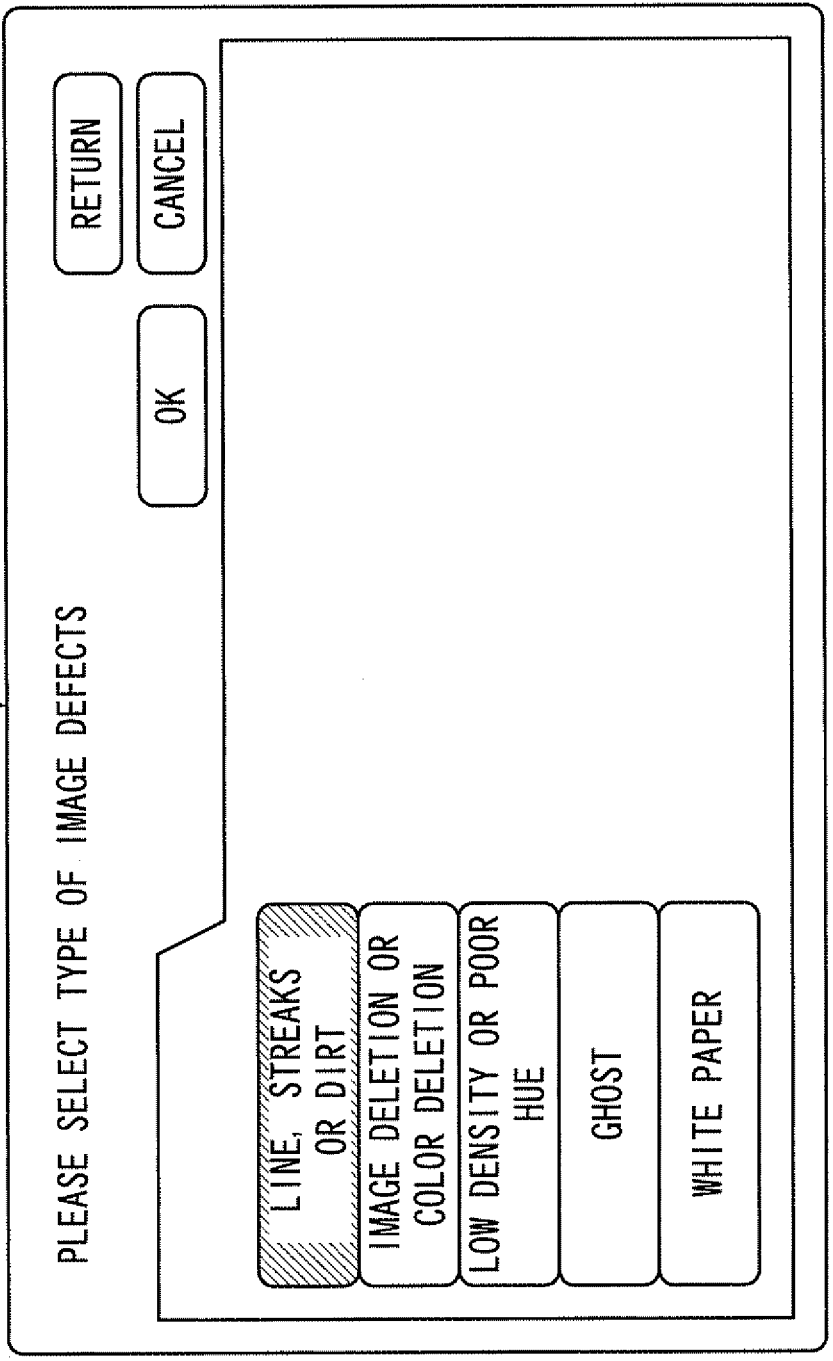
FIG. 4 is a view showing an example of the display screen for types of image defects displayed on the operation display.

When execution of "diagnose image" is selected by an operation input made by the user on the operation display 50, the controller 10 transmits, to the operation display 50 through the operation display I/F 83, a control signal for instructing the operation display 50 to display types of image defects to be diagnosed. Upon receipt of the signal, the operation display 50 displays types of image defects as shown in FIG. 4 (which is a view showing an example of the display screen for types of image defects displayed by the operation display 50). Here, displayed is, for example, a screen including, as types of image defects: "line, streaks or dirt" indicating a linear dirt, a streak dirt or a dirt in another shape appearing on an image; "image deletion or color deletion" indicating missing of images with all color components or images with some of the color components; "low density or poor hue" indicating a problem in image density or color; "ghost" indicating a problem that a copy of a prior image is additionally printed like a ghost in an overlapping manner downstream of a sheet in a sheet transportation direction; and "white paper" indicating a problem that no image is printed on a sheet. Additionally, the operation display 50 also displays an instruction comment for instructing the user to select any of these types of image defects.

Figure 5:
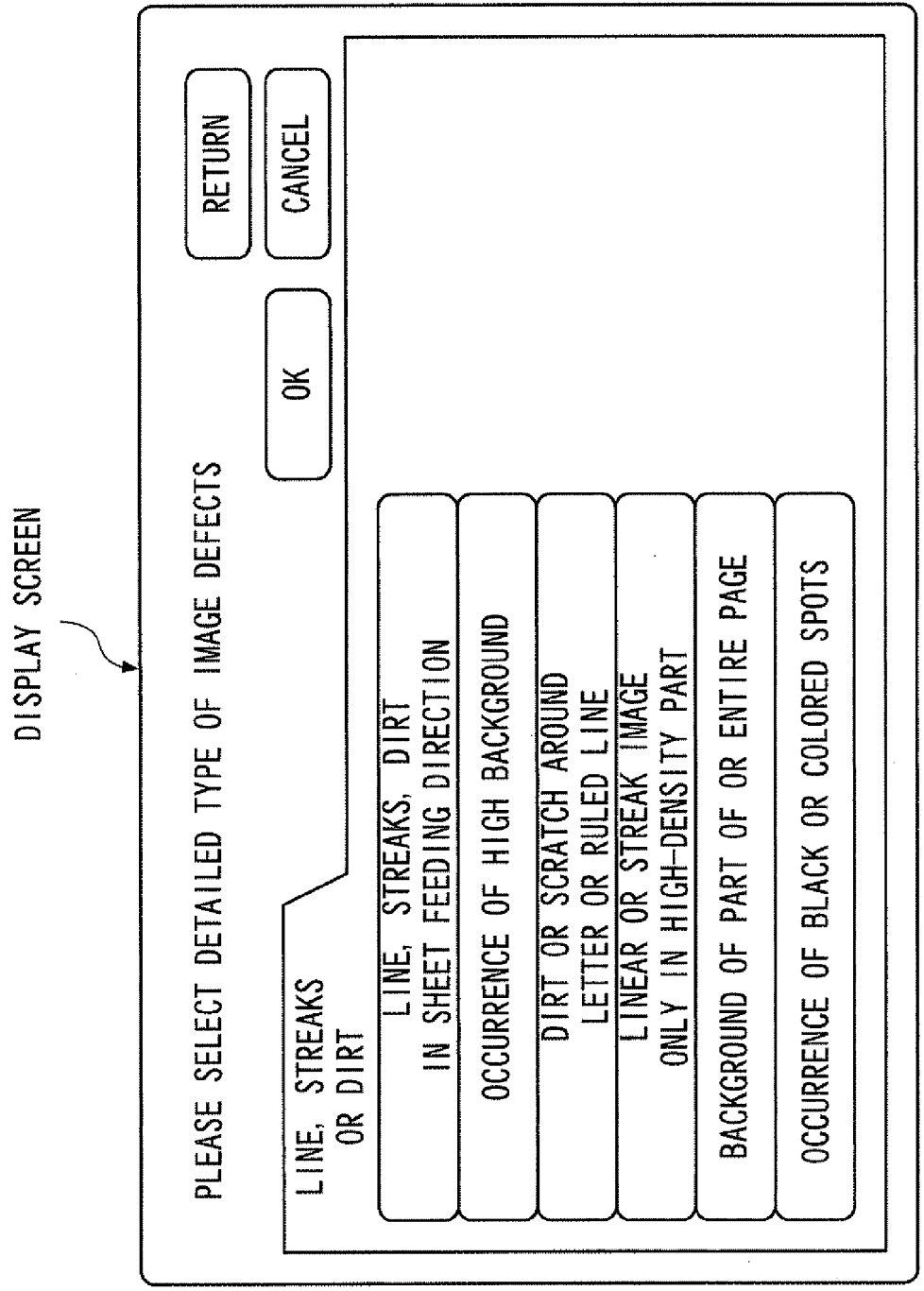
FIG. 5 is a view showing an example of the display screen for the detailed types of image defects displayed on the operation display.

Here, assume, for example, that "line, streaks or dirt" (the hatched field in FIG. 4) is selected by an operation input made by the user on the operation display 50. Upon receipt of the input, the controller 10 transmits, to the operation display 50 through the operation display I/F 83, a control signal for instructing the operation display 50 to display further detailed types of image defects related to the image defect type "line, streaks or dirt". Upon receipt of the signal, the operation display 50 displays detailed types of image defects related to "line, streaks or dirt" as shown in FIG. 5 (which is a view showing an example of the display screen for the detailed types of image defects displayed by the operation display 50). Here, displayed is, for example, a display screen including, as the detailed types of image defects: "line, streaks or dirt in sheet feeding direction" indicating a linear or streak dirt appearing in the sheet transportation direction on an image; "occurrence of high background" indicating a slight dirt (so-called "high background") spreading over an entire image; "dirt or scratch around letter or ruled line" indicating a dirt or scratch occurring around a letter, a ruled line or the like as if toner is scattered; "linear or streak image only in high-density part" indicating a linear or streak dirt occurring only in a high-density region of an image; "background of part of or entire page" indicating a problem that part of a sheet or the entire sheet is filled in; and "occurrence of black or colored spots" indicating spots in a color component (primary color) (black spots or colored spots) occurring in a blank region of a sheet. Additionally, the operation display 50 also displays an instruction comment for instructing the user to select any of the detailed types of image defects.

Here, assume, for example, that "line, streaks or dirt in sheet feeding direction," which is one of the detailed types of image defects, is selected by an operation input made by the user on the operation display 50. In this case, the controller 10 selects a test chart to be used for diagnosing the defects in terms of "line, streaks or dirt in sheet feeding direction." Then, the controller 10 transmits, to the image forming part 40 through the video I/F 82, a control signal for instructing the image forming part 40 to print the selected test chart. Upon receipt of the signal, the image forming part 40 prints the test chart instructed by the controller 10 to print. Here, for the printing of the test chart, a color component (yellow (Y), magenta (M), cyan (C) or black (K)) to be used for the printing is also specified by the user on the basis of the occurrence state of image defects. For example, when the black (K) color is specified, the test chart with the black (K) color is printed.

Moreover, the controller 10 transmits, to the operation display 50 through the operation display I/F 83, a control signal for instructing the operation display 50 to display an instruction for instructing the user to operate the image scanner part 60 to scan the printed test chart. Upon receipt of the signal, the operation display 50 displays an instruction comment for instructing the user to operate the image scanner part 60 to scan the printed test chart. Here, the controller 10 and the operation display 50 function as an instruction unit that instructs a user to operate the image scanner part 60 to scan a test chart.

When the test chart image is scanned by the image scanner part 60, the controller 10 causes the image scanner part 60 to transfer image data on the reflectance of the test chart, to the fault diagnostic unit 20 (image data acquiring portion 21).

In this way, the image data acquiring portion 21 of the fault diagnostic unit 20 acquires the image data on the test chart. The image data on the test chart acquired by the image data acquiring portion 21 is transferred to and then stored in the image data storage 22.

<Description of Defect Region Detector>

Next, the defect region detector 23 will be described.

The defect region detector 23 according to the present exemplary embodiment acquires the image data on the reflectance of the test chart selected by the user on the basis of the occurrence state of image defects. This test chart is an example of a test target image selected in accordance with the occurrence state of image defects. In this test chart, image samples (hereinafter, "threshold calculation test patches"), as an example of threshold calculation images, having a predetermined density value (tone density value) as an output value are formed at positions set in advance, in addition to a defect diagnosis image for diagnosing image defects (hereinafter, "defect diagnosis test target image").

Then, prior to the execution of the image defect diagnosis, the defect region detector 23 calculates image density thresholds for the entire region in which an image may be formed, which is used for judging occurrence regions of image defects, on the basis of the image data pieces on the threshold calculation test patches formed in the test chart. Thereby, regions each having an image defect are judged by using the image data piece on the defect diagnosis test target image formed on the same test chart and the calculated image density thresholds.

Figure 6:
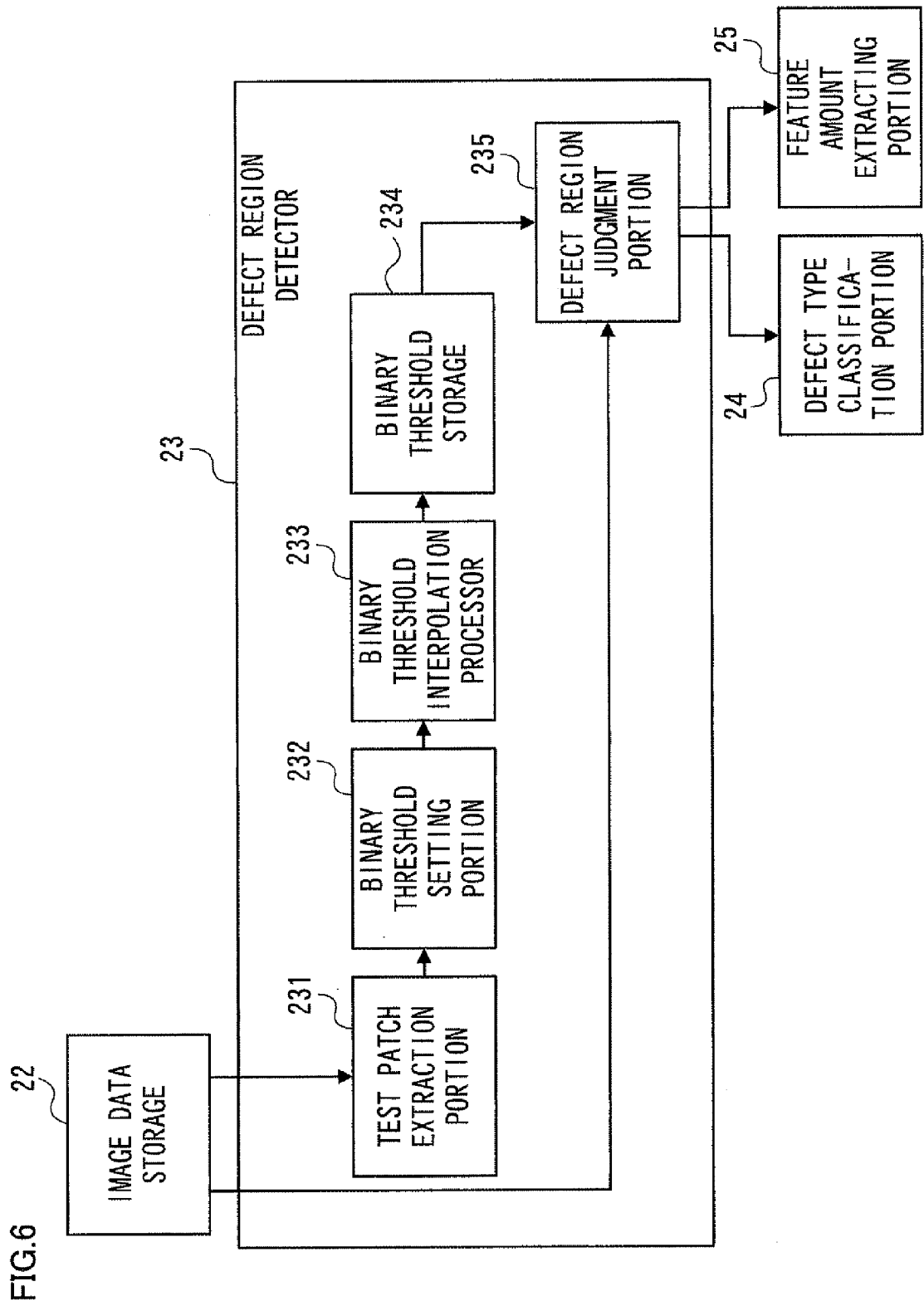
FIG. 6 is a block diagram for explaining a configuration of the defect region detector.

FIG. 6 is a block diagram for explaining a configuration of the defect region detector 23.

As shown in FIG. 6, the defect region detector 23 includes a test patch extraction portion 231 and a binary threshold setting portion 232. The test patch extraction portion 231 acquires, from the image data storage 22, image data pieces on the threshold calculation test patches formed in the test chart, and extracts, from the acquired image data pieces on the threshold calculation test patches, image data pieces of regions (partial regions) in which the threshold calculation test patches are formed, and positional information pieces thereof. The binary threshold setting portion 232 sets image density thresholds (hereinafter, "binary thresholds") for judging whether or not respective partial regions in which the threshold calculation test patches are formed have image defects, by associating the image density thresholds with the positional information pieces of the respective partial regions. Each of the "binary thresholds" set here is used for specifying a density level (image density threshold) as a criteria for judging whether an image defect occurs (for example, a logic level "1") or not (for example, a logic level "0").

Moreover, the defect region detector 23 includes a binary threshold interpolation processor 233 and a binary threshold storage 234. The binary threshold interpolation processor 233 calculates binary thresholds for the entire region in which an image may be formed, by performing interpolation processing for the binary thresholds for respective partial regions in which the threshold calculation test patches are formed. The binary threshold storage 234 stores the binary thresholds for the entire region in which an image may be formed, which is calculated by the binary threshold interpolation processor 233, by associating the binary thresholds with the positional information pieces of the respective regions for which the binary thresholds are calculated.

Further, the defect region detector 23 includes a defect region judgment portion 235 that acquires, from the image data storage 22, the image data piece on the defect diagnosis test target image formed in the test chart, and judges regions having image defects, by using the binary thresholds stored in the binary threshold storage 234.

<Description of Threshold Calculation Test Patches>

The image data pieces on the threshold calculation test patches, which are acquired from the image data storage 22 by the test patch extraction portion 231, are image data detected by causing the image scanner part 60 to scan the threshold calculation test patches formed in the test chart. Here, the test chart in which the threshold calculation test patches and the defect diagnosis test target image are formed is formed on a sheet having a maximum size (for example, A3 size) at image formation by the image forming apparatus 1, for example. For example, in a case where tone density values are set as 256 tones (=0 to 255 steps), the threshold calculation test patches in the test chart are set to have a tone density value different from that of the background portion by approximately 20 steps.

For example, as threshold value calculation test patches to be used in a case of calculating binary thresholds for the blank region (highlight region), threshold calculation test patches having, for example, an output value of the tone density value "235" with respect to the tone density value "255" of the blank (background portion) are formed at positions set in advance on the sheet. Meanwhile, as threshold calculation test patches to be used in a case of calculating binary thresholds for an intermediate color region (gray region), threshold calculation test patches having, for example, an output value of the tone density value "100" with respect to the tone density value "80" of the background portion are formed at positions set in advance on the sheet.

Figure 7A:
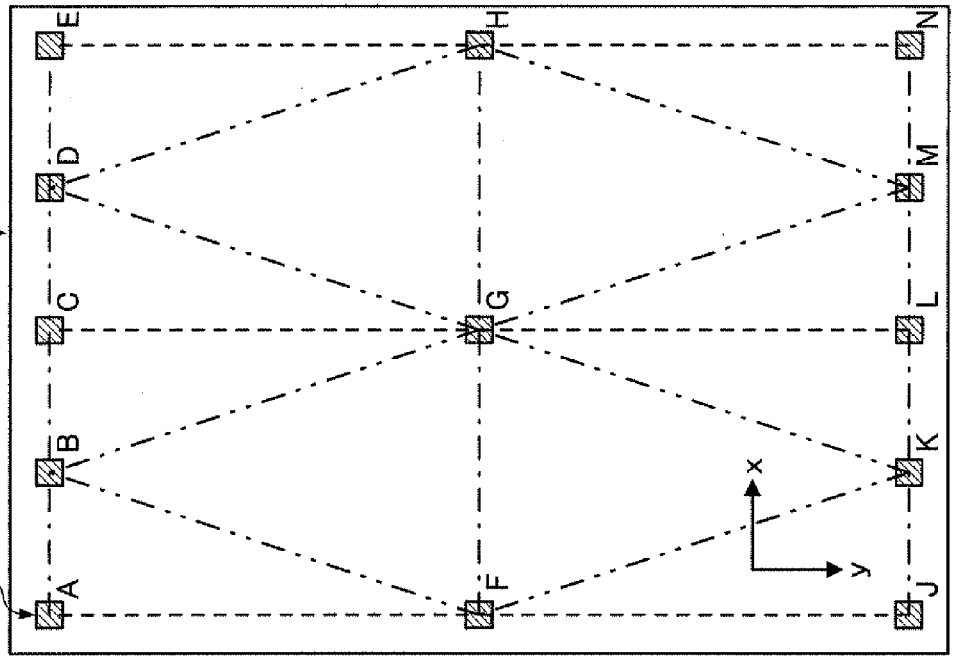
FIGS. 7A and 7B are views illustrating threshold calculation test patches as examples.
Figure 7B:
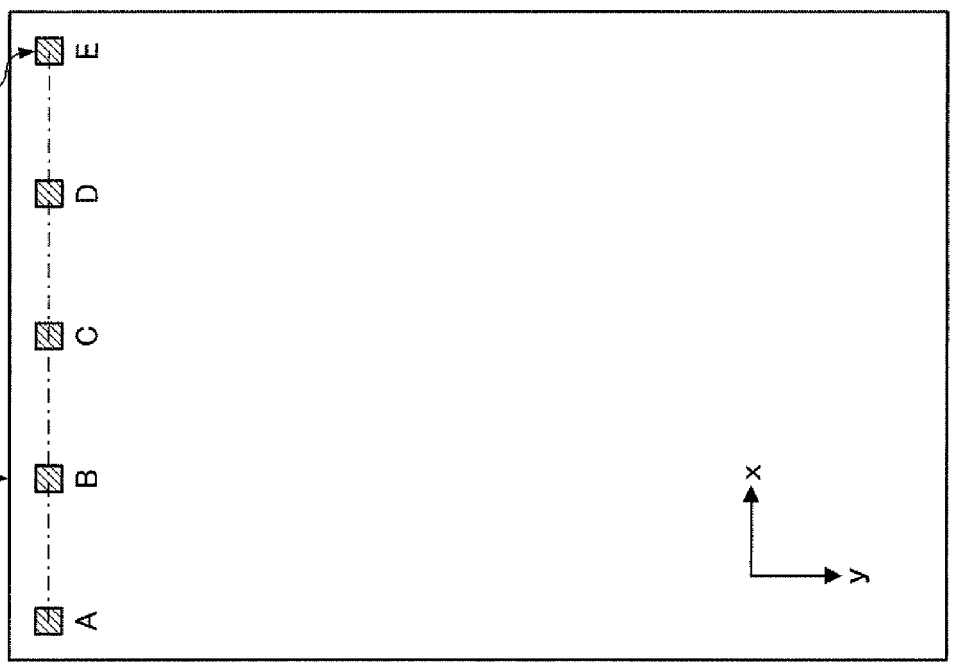

Next, FIGS. 7A and 7B are views illustrating threshold calculation test patches formed in the test chart as examples. FIG. 7A shows multiple (5 or 3) threshold calculation test patches (A to E) arrayed in a first scan direction (x direction). FIG. 7B shows multiple test patches (A to N) formed of multiple (3) arrays in a slow scan direction (y direction) each including multiple (5) threshold calculation test patches arrayed in the first scan direction. In the threshold calculation test patches shown in FIG. 7B, 3 threshold test patches (F, G, H) are set to be located at the central portion and arrayed in the first scan direction.

Note that, in the test chart, the defect diagnosis test target image is also formed in addition to the threshold calculation test patches. However, in FIGS. 7A and 7B, illustration of the defect diagnosis test target image is omitted.

Unevenness of density occurring in one image (so-called "density unevenness") tends to occur depending on position in the first scan direction. Thus, as shown in FIGS. 7A and 7B, in the test chart, multiple (5 or 3) threshold calculation test patches (each of the patches A to E, patches F to H, and patches J to H) are arrayed in one line along the first scan direction (dashed lines). With such an arrangement, the threshold calculation test patches are configured so that binary thresholds corresponding to the unevenness of the density occurring depending on positions on one image in the first scan direction may be calculated. For example, in a case of using the threshold calculation test patches shown in FIG. 7A, binary thresholds corresponding to unevenness of the density of the entire area in the first scan direction may be calculated by performing, in the first scan direction, interpolation processing for the binary thresholds obtained on the basis of the multiple (5) threshold calculation test patches (A to E) on one line along the first scan direction.

Alternatively, for example, in a case of using the threshold calculation test patches, which is shown in FIG. 7B, including multiple (3) arrays in the slow scan direction each forming of multiple (5 or 3) threshold calculation test patches arrayed in the first scan direction, binary thresholds corresponding to unevenness of density of the entire region where an image may be formed may be calculated.

For example, there may be calculated binary thresholds corresponding to unevenness of density of entire regions on each of lines, forming three arrays in the slow scan direction, along the first scan direction, on the basis of each of the threshold calculation test patches (each of the patches A to E, patches F to H, and patches J to N) on the corresponding one of the lines (dashed line), forming three arrays in the slow scan direction, along the first scan direction.

In addition, there may be calculated binary thresholds corresponding to unevenness of density of the entire region in each of three lines, located at positions in the first scan direction different from each other, along the slow scan direction, on the basis of the multiple (3) threshold calculation test patches (each of patches A to J, patches C to L and patches E to N) arrayed along each of the three lines (broken lines) along the slow scan direction.

Moreover, there may be calculated binary thresholds corresponding to unevenness of density of regions spreading between the above-mentioned lines along the first scan direction (dashed lines) and the above-mentioned lines along the slow scan direction (broken lines), on the basis of the threshold calculation test patches on the lines (chain double-dashed lines) each joining multiple (2 or 3) threshold calculation test patches (each of patches B, G and M, patches B and F, and the like) located different positions in the slow scan direction and located adjacent positions in the first scan direction.

These binary thresholds obtained in the entire areas on the three different kinds of lines (broken lines, dashed lines, chain double-dashed lines) are associated with the positional information pieces thereof. Thus, by performing interpolation calculation in any of the first scan direction or the slow scan direction by using these binary thresholds and the positional information pieces of the respective regions for which the binary thresholds are calculated, binary thresholds for the respective regions into which the entire area in which the image may be formed is finely divided may be calculated.

Note that, in the threshold calculation test patches illustrated in FIGS. 7A and 7B as examples, each of the threshold calculation test patches are shaped as a rectangular (quadrangle). However, it may be shaped as another form such as a circle, an oval or the like.

<Description of Test Patch Extraction Portion>

The test patch extraction portion 231 acquires, from the image data storage 22, detected image data pieces (hereinafter, "detection image data pieces") on the threshold calculation test patches illustrated in FIG. 7A, for example. Then, detection image data pieces of the regions (partial regions) where the threshold calculation test patches are respectively formed and positional information pieces thereof are extracted from the acquired detection image data pieces on the threshold calculation test patches. When the threshold calculation test patches are set in the image scanner part 60, positional displacement or inclination may occur between positions of the threshold calculation test patches and reference positions for causing an image scanner sensor (not shown) provided in the image scanner part 60 to scan the test chart depending on how the threshold calculation test patches are placed with respect to the image scanner part 60 (setting state). Therefore, the test patch extraction portion 231 performs known position correction processing, inclination correction processing or the like, and then extracts the image data pieces of the threshold calculation test patches and positional information pieces thereof in the first scan direction. Moreover, the test patch extraction portion 231 outputs, to the binary threshold setting portion 232, the extracted detection image data pieces of the threshold calculation test patches and positional information pieces thereof.

<Description of Binary Threshold Setting Portion>

The binary threshold setting portion 232 obtains, from the detection image data pieces of the threshold calculation test patches acquired from the test patch extraction portion 231, binary thresholds for tone density values (hereinafter "detection tone density values") as reflectance data for pixels forming each of the threshold calculation test patches, as follows. Specifically, the binary threshold setting portion 232 calculates, for each of the threshold calculation test patches, for example, a ratio (hereinafter, "detection area ratio" (=detection area/area of each of the threshold calculation test patches) of a cumulative value (hereinafter, "detection area") obtained by cumulating areas of regions formed of pixels having a detection tone density value not less than the binary threshold to an area of each of the threshold calculation test patches, by using the binary threshold as a parameter (variable), for example. Then, the binary threshold setting portion 232 obtains each binary threshold for causing the corresponding detection area ration to be 0.5 (50%), and the obtained binary threshold is set as a binary threshold for judging whether or not an image defect occurs. The binary threshold setting portion 232 outputs, to the binary threshold interpolation processor 233, the set binary thresholds by associating each of the binary thresholds with the positional information pieces thereof in the first scan direction, the positional information pieces being information pieces of the partial regions where the corresponding threshold calculation test patches are located.

Here, another method may be used as a method for setting the binary thresholds in the binary threshold setting portion 232. For example, an average of the detection tone density values of the pixels in each of the detection image data pieces may be used. Instead, a center value between the maximum value and the minimum value of the detection tone density values of the pixels in each of the detection image data pieces may be used, or binary thresholds causing the detection area ratio of a value other than 0.5, for example 0.4, may be used. Alternatively, binary thresholds may be set on the basis of the above-mentioned area ratio, by weighting detection tone density values within a predetermined range.

Note that, for example, the same is true for a case of using the threshold calculation test patches illustrating in FIG. 7B.

In general, it is difficult for a photoreceptor provided in the image forming part 40 configured by, for example, an electrophotographic image forming engine, to obtain uniform sensitivity (hereinafter, "photoreceptor sensitivity") for exposure light on an entire region of a photoreceptor surface. Further, the photoreceptor sensitivity may vary according to regions of the photoreceptor surface due to a degree of temporal change, influence of temperature and humidity and the like. Moreover, it is also difficult for an exposure device configured of, for example, a laser beam, LEDs or the like for exposing the photoreceptor and an optical system guiding light from the exposure device toward the photoreceptor to obtain a uniform exposure light amount onto the entire photoreceptor surface in the first scan direction. Further, also in a charging device that charges the photoreceptor and a transfer device that transfers a toner image formed on the photoreceptor onto an intermediate transfer body or a sheet, uniform charge and transfer may not be performed on the entire photoreceptor surface in the first scan direction. They are not caused by any failure, but caused by a property inherent in the image forming part 40 formed of, for example, an electrophotographic image forming engine. Thus, such an event occurs as an individual difference depending on each image forming apparatus 1.

Thereby, variation in density inherent in each image forming apparatus 1 occurs in a toner image formed on a sheet. Such variation in density influences the judgment for an image defect. For example, it is assumed that a fixed image density threshold (same value) is used for all of image regions for the judgment for an image defect. In such a case, due to the variation in density, one region may be judged as the one having an image defect, while another region may be judged as the one not having an image defect. In particular, in a case of detecting an image defect for a low density image (hereinafter, "highlight image") having a small density contrast with a background portion (blank), judgment for an image defect is greatly influenced even by slight variation in density.

As mentioned above, image density reproducibility under the same printing condition is not the same among in the electrophotographic image forming apparatuses 1, and even in one image forming apparatus 1, unevenness of density occurs in one image field. Accordingly, a detection accuracy for detecting image defect may be decreased due to image density difference between machines and unevenness of image density in one field, and accordingly estimation accuracy for estimating a failure part of the image forming apparatus 1 may be decreased.

To avoid this, in the image forming apparatus 1 according to the present exemplary embodiment, a binary threshold to be specified for the image density for judging whether or not an image defect occurs in a highlight image, for example, is set for each partial region within an image region so as to correspond to variation in density inherent in the image forming part 40 in each image forming apparatus 1. Thereby, influence of the variation in density inherent in each image forming apparatus 1 is reduced, and detection accuracy for detecting an image defect is increased.

<Description of Binary Threshold Interpolation Processor>

Subsequently, the binary threshold interpolation processor 233 performs interpolation processing of the binary thresholds for the respective partial regions where the threshold calculation test patches are formed in the test chart, by using linear interpolation computation, spline interpolation computation and the like, for example. Thereby, the binary thresholds for all of the region where an image may be formed are calculated.

Figure 8:
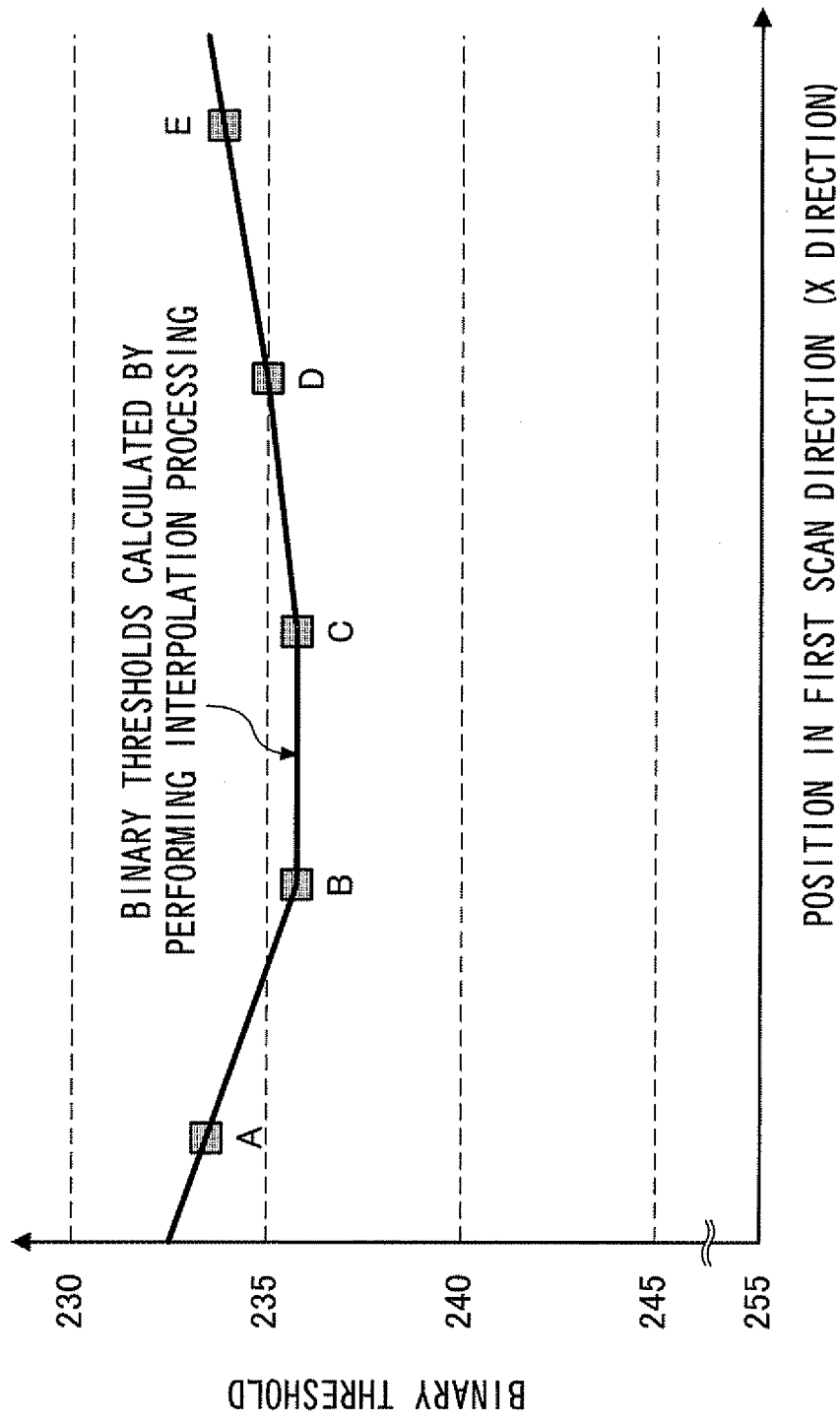
FIG. 8 is a graph for explaining the interpolation processing performed by the binary threshold interpolation processor.

Here, FIG. 8 is a graph for explaining the interpolation processing performed by the binary threshold interpolation processor 233. In FIG. 8, the binary thresholds for the five threshold calculation test patches (A to E), which are formed in the first scan direction (x direction) in FIG. 7A, are processed by use of linear interpolation. As described above, due to the deployment property and structural feature of the exposure device and the optical system that expose the photoreceptor and further the charging device and the transfer device, variation in density occurring in an image easily occur in the first scan direction. Therefore, the interpolation processing (linear interpolation processing) in the first scan direction is performed for the binary thresholds for the threshold calculation test patches (A to E) formed in the first scan direction (x direction). Then, the binary thresholds in the first scan direction obtained by the interpolation processing for the binary thresholds for the threshold calculation test patches (A to E) are stored in the binary threshold storage 234 as an example of a memory by associating the obtained binary thresholds with the positional information pieces thereof in the first scan direction.

Note that, the test patch extraction portion 231, the binary threshold setting portion 232 and the binary threshold interpolation processor 233 function as a threshold setting unit.

<Description of Defect Region Determination Portion>

The defect region judgment portion 235 is an example of a diagnostic unit, and acquires, from the image data storage 22, image data piece on the defect diagnosis test target image in the test chart (hereinafter, "test image data piece") and the positional information piece associated with the test image data piece. Then, the defect region judgment portion 235 compares the test image data piece on the defect diagnosis test target image at each position in the first scan direction and the binary threshold corresponding to the position of the test image data piece in the first scan direction stored in the binary threshold storage 234, by using the positional information piece associated with the test image data piece. Thereby, the region having an image defect is judged. Further, the defect region judgment portion 235 extracts the test image data piece on the region judged as the one having an image defect, as image defect data composed of multiple-valued data pieces. Furthermore, the defect region judgment portion 235 outputs the extracted image defect data piece to the defect type classification portion 24 and the feature amount extracting portion 25.

<Description of Defect Type Classification Portion>

Next, the defect type classification portion 24 calculates feature values for an image defect, such as size of the region having an image defect, a tone density value and the like, on the basis of the image defect data piece acquired from the defect region detector 23 (defect region judgment portion 235). By using the calculated feature values, clustering processing is performed. Here, the clustering processing classifies image defect data pieces having similarities in image defect type into data groups. For the clustering processing, any one of existing algorithms such as k-means clustering and various kinds of hierarchical clustering is used. The defect type classification portion 24 outputs, to the feature amount extracting portion 25, information on the image defect type classified by the clustering processing.

The image defect types for the image defect data pieces that are classified by the clustering processing include, for example, "line or streaks in sheet feeding direction (slow scan direction)," "high background," "dirt or scratch around letter or ruled line," "line or streaks in high-density part," "filling-in of part of or entire page," "black or colored spots" and the like.

Moreover, the defect type classification portion 24 selects an image defect diagnosis model (see the following paragraphs) to be used to estimate the image defects in accordance with the image defect type classified by the clustering processing. Then, the defect type classification portion 24 outputs, to the diagnostic portion 26, information identifying the selected image defect diagnosis model.

<Description of Feature Amount Extracting Portion>

Subsequently, the feature amount extracting portion 25 extracts various feature amounts characterizing the image defects, on the basis of the image defect data pieces acquired from the defect region detector 23 and information on the image defect type acquired from the defect type classification portion 24. Here, the feature amount extracting portion 25 extracts, for example, feature amounts such as the shape, size, tone density value, outline state, image-defect occurrence direction and periodicity of the region having each image defect, for each image defect type.

For example, assume that the defect diagnosis test target image includes image defects in which black lines occur, and that the color component with which the image defects occur is the black (K) color and the image defect type is classified as, for example, "line or streaks in sheet feeding direction (slow scan direction)" by the defect type classification portion 24, by the image defect data pieces acquired from the defect region detector 23. In this case, the feature amount extracting portion 25 calculates, as feature amounts, the line widths, lengths, contrasts and periodicity of the black lines, for example.

Then, the feature amount extracting portion 25 outputs information on the calculated feature amounts, to the diagnostic portion 26.

<Description of Diagnostic Portion>

The diagnostic portion 26 estimates image defects by using an image defect diagnosis model. Specifically, the diagnostic portion 26 inputs, into the image defect diagnosis model, the feature amounts calculated by the feature amount extracting portion 25, the information on the detailed type of the image defects acquired from the controller 10 through the operation input by a user (for example, "occurrence of black or colored spots"), the various kinds of information on the image forming apparatus 1, and the like, and thereby estimates a failure cause bringing about the image defects.

In the estimation, the diagnostic portion 26 reads, from a storage (for example, a nonvolatile memory (NVM) 204 to be described later with reference to FIG. 11), an image defect diagnosis model corresponding to the type of the image defects selected by the defect type classification portion 24. In the present exemplary embodiment, image defect diagnosis models corresponding respectively to multiple types of image defects are stored, in advance, in the storage provided in the diagnostic portion 26. Accordingly, the diagnostic portion 26 reads, from the storage, an image defect diagnosis model selected by the defect type classification portion 24.

Each of the "image defect diagnosis models" here is represented by a Bayesian network, for example. A Bayesian network models a problem area by using probability theory. Specifically, in order to represent a problem area having a complex causal relationship, a Bayesian network is expressed as a network having a graph structure in which causal relationships between multiple problem factors associated with each other are sequentially connected, and thereby representing the dependency relationship between the problem factors by a directed graph.

Figure 9:
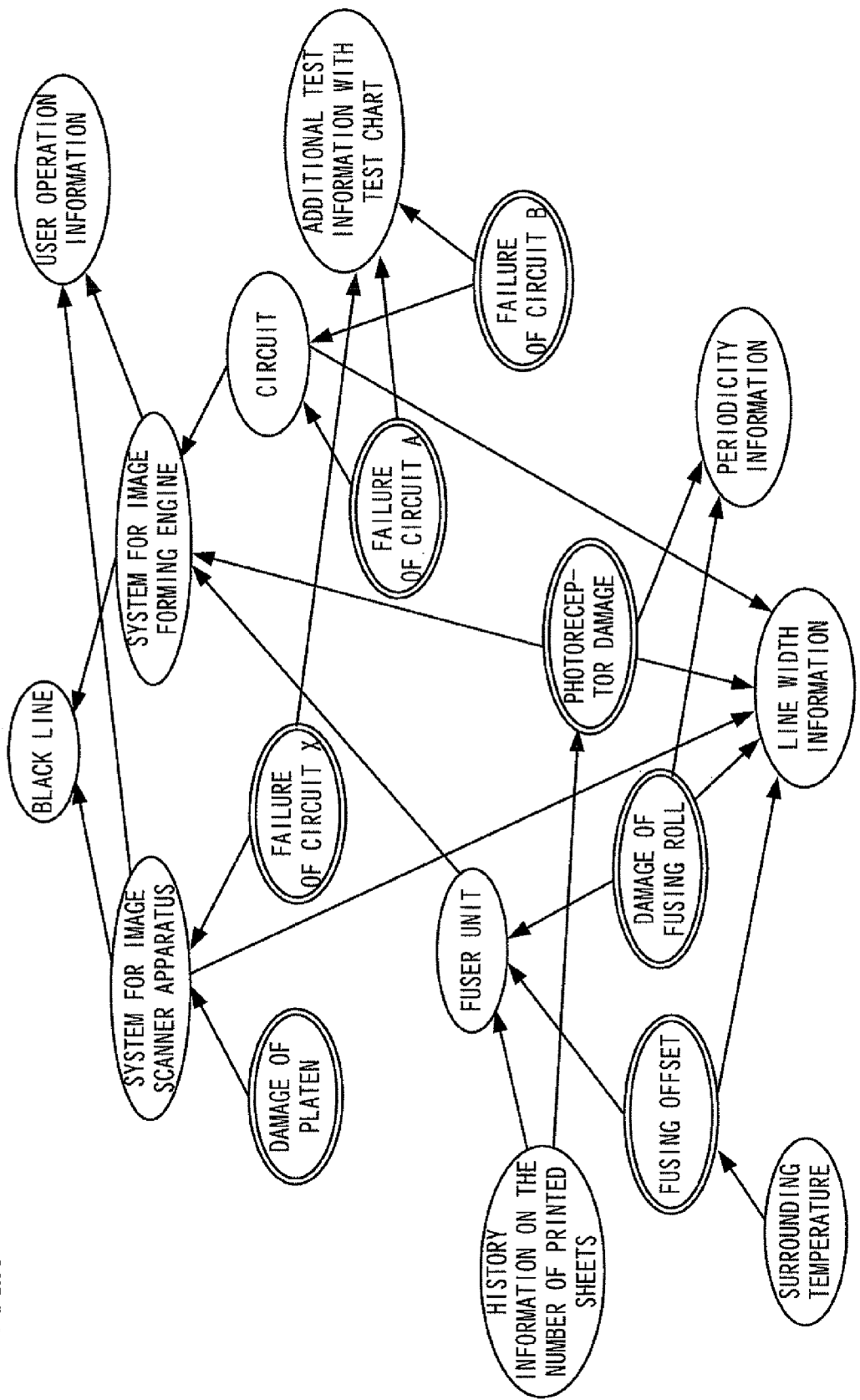
FIG. 9 is a view showing an example of the Bayesian network forming the image defect diagnosis model.

FIG. 9 is a view showing an example of the Bayesian network forming the image defect diagnosis model. The image defect diagnosis model shown in FIG. 9 is a Bayesian network corresponding to occurrence of a black line as an image defect.

As shown in FIG. 9, each two nodes of the Bayesian network are connected to represent a "cause" to "effect" relationship. For example, the relationship between "photoreceptor damage" and "line width information" represents a relationship in which, due to a "photoreceptor damage" (cause), "line width information" indicating an occurrence of a thin line (effect) is generated. Meanwhile, the relationship between "history information on the number of printed sheets" and "fuser unit" represents a relationship in which a state based on the "number of printed sheets" (the number of printed sheets is a certain number or larger) (cause) increases the probability of occurrence of a black line attributable to deterioration of the "fuser unit." The initial value of the probability data on each node is determined, for example, on the basis of past data. The probability of each node may be updated regularly on the basis of statistic data on market troubles and the like including the frequency at which a component of the image forming apparatus 1 is changed, the frequency at which a problem occurs, and the like. In addition, the state of each node, such as "line width information" or "periodicity information" shown in FIG. 9, representing the feature of image defects, is determined by the feature amounts calculated by the feature amount extracting portion 25.

On the basis of the Bayesian network read from the storage, the diagnostic portion 26 estimates a failure cause and a failure part. Moreover, the diagnostic portion 26 notifies the controller 10 of the estimated failure cause and failure part. Thereby, the controller 10 displays the estimated failure cause and failure part on the operation display 50 to notify the user of the estimation results. The controller 10 may also notify an external apparatus such as a PC through the communicating part 70 via a network.

FIG. 10 is a view showing an example of a display screen for a diagnosis result displayed on the operation display 50. As shown in FIG. 10, "estimated failure causes and failure parts" are displayed in descending order of probability ("failure probability"), and "operation difficulty levels" of restoration of the respective failure states are also displayed. Displaying the operation difficulty levels leads to efficient restoration by performing, for example, when estimated failure causes and failure parts having close probabilities are displayed, restoration operation on the one having a lower operation difficulty level first. The display screen may be configured to display, in addition to the items shown in FIG. 10, operation information indicating restoration operation corresponding to each estimated failure cause and failure part, by operating the section for the corresponding "estimated failure cause and failure part."

<Description of Internal Configuration of Fault Diagnostic Unit>

Figure 11:
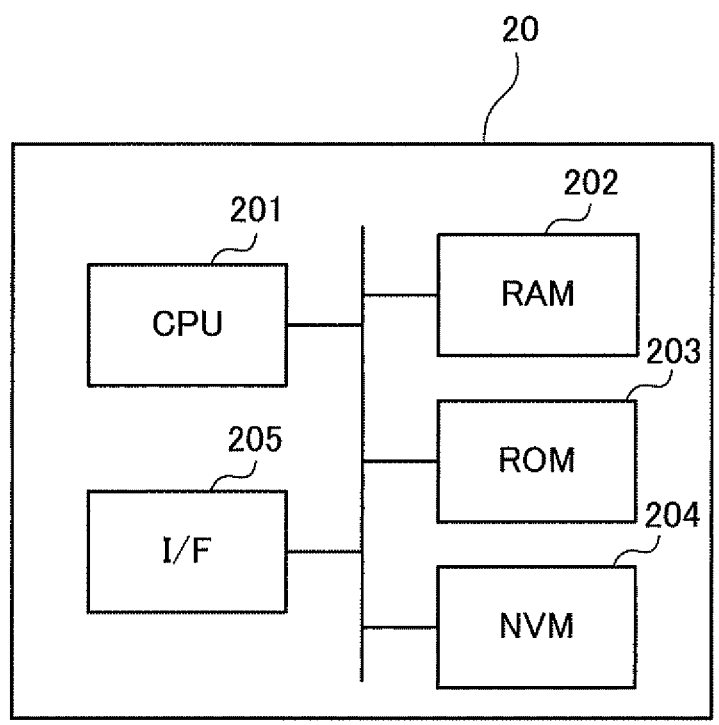
FIG. 11 is a block diagram showing an internal configuration of the fault diagnostic unit.

FIG. 11 is a block diagram showing an internal configuration of the fault diagnostic unit 20. As shown in FIG. 11, the fault diagnostic unit 20 includes a central processing unit (CPU) 201, a random access memory (RAM) 202, a read only memory (ROM) 203, the NVM 204 and an interface (I/F) 205. The CPU 201 performs digital arithmetic processing in accordance with a predetermined processing program in fault diagnosis processing. The RAM 202 is used as an operation memory for the CPU 201, or the like. The ROM 203 stores various set values and the like to be used in the processing by the CPU 201. The NVM 204 is a battery-backed rewritable flash memory or the like capable of storing data even when power supply is lost. The I/F 205 controls input and output of a signal to and from the units such as the controller 10, the external storage 30 and the image scanner part 60 connected to the fault diagnostic unit 20 through the PCI bus 80.

With this configuration, the CPU 201 loads the processing program from the external storage 30 into the main storage (RAM 202), thereby implements the functions of the functional portions, i.e., the image data acquiring portion 21, the defect region detector 23, the defect type classification portion 24, the feature amount extracting portion 25 and the diagnostic portion 26.

Another mode of providing the processing program is to provide the processing program stored in advance in the ROM 203 and then load the processing program into the RAM 202. Still another way, if the rewritable ROM 203 such as an electrically erasable and programmable ROM (EEPROM) is included, is to install only the program into the ROM 203 after setting of the CPU 201 and then load the program into the RAM 202. Still another way is to transmit the program to the fault diagnostic unit 20 via a network such as the Internet, install the program into the ROM 203 of the fault diagnostic unit 20, and then load the program into the RAM 202. Even still another way is to load the program from an external recording medium such as a DVD-ROM or a flash memory into the RAM 202.

<Description of Processing Content of Fault Diagnostic Unit>

Here, a content of the fault diagnosis processing performed by the fault diagnostic unit 20 is shown here.

Figure 12:
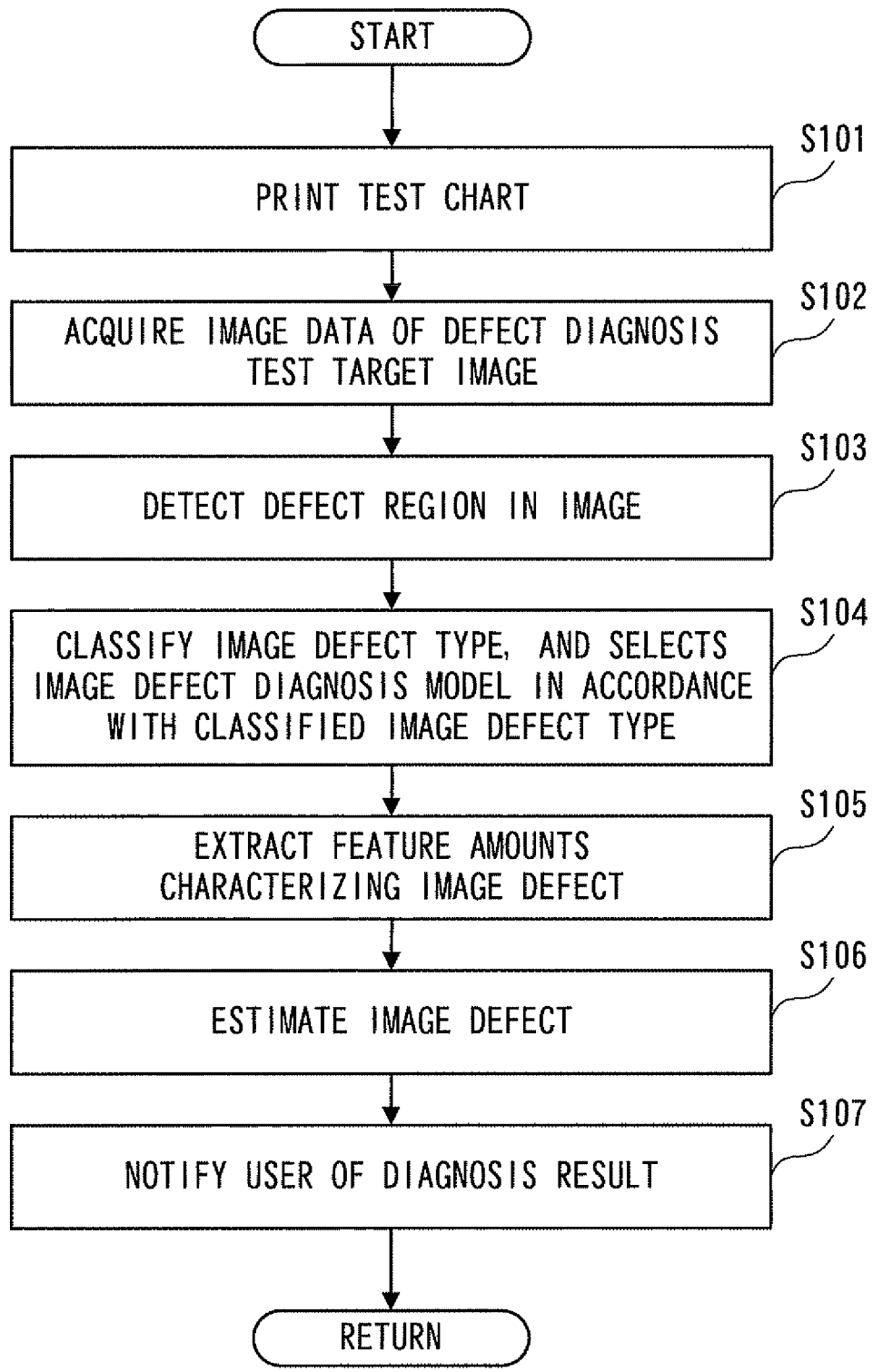
FIG. 12 is a flowchart showing an example of the content of the fault diagnosis processing performed by the fault diagnostic unit.

FIG. 12 is a flowchart showing an example of the content of the fault diagnosis processing performed by the fault diagnostic unit 20.

As shown in FIG. 12, upon the selection of the detailed type of the image defects by a user, the controller 10 selects a test chart in which the threshold calculation test patches and the defect diagnosis test target image are formed, and then causes the image forming part 40 to print the test chart (Step 101).

After the test chart is printed and the printed test chart is scanned by the image scanner part 60, the fault diagnostic unit 20 acquires image data formed of reflectance data of the defect diagnosis test target image in the test chart (Step 102).

Then, the fault diagnostic unit 20 detects a defect region in the image from the acquired image data piece of the defect diagnosis test target image (Step 103). Further, the fault diagnostic unit 20 classifies the image defect type thereof, and selects an image defect diagnosis model used for estimation of the image defect in accordance with the classified image defect type (Step 104). Furthermore, the fault diagnostic unit 20 extracts various feature amounts characterizing the image defect (Step 105).

Thereafter, the fault diagnostic unit 20 inputs, to the image defect diagnosis model, the feature amounts, information on the detailed type of the image defect through an operation input by the user and various kinds of information of the image forming apparatus 1, and estimates the image defect (Step 106). Moreover, the fault diagnostic unit 20 causes the operation display 50 to display the diagnosis result through the controller 10, and notifies the user of the diagnosis result (Step 107).

<Description of Processing Content of Fault Diagnostic Unit>

In addition, the fault diagnostic unit 20 automatically sets the binary thresholds specified for image density in order to judge whether or not an image defect occurs.

Figure 13:
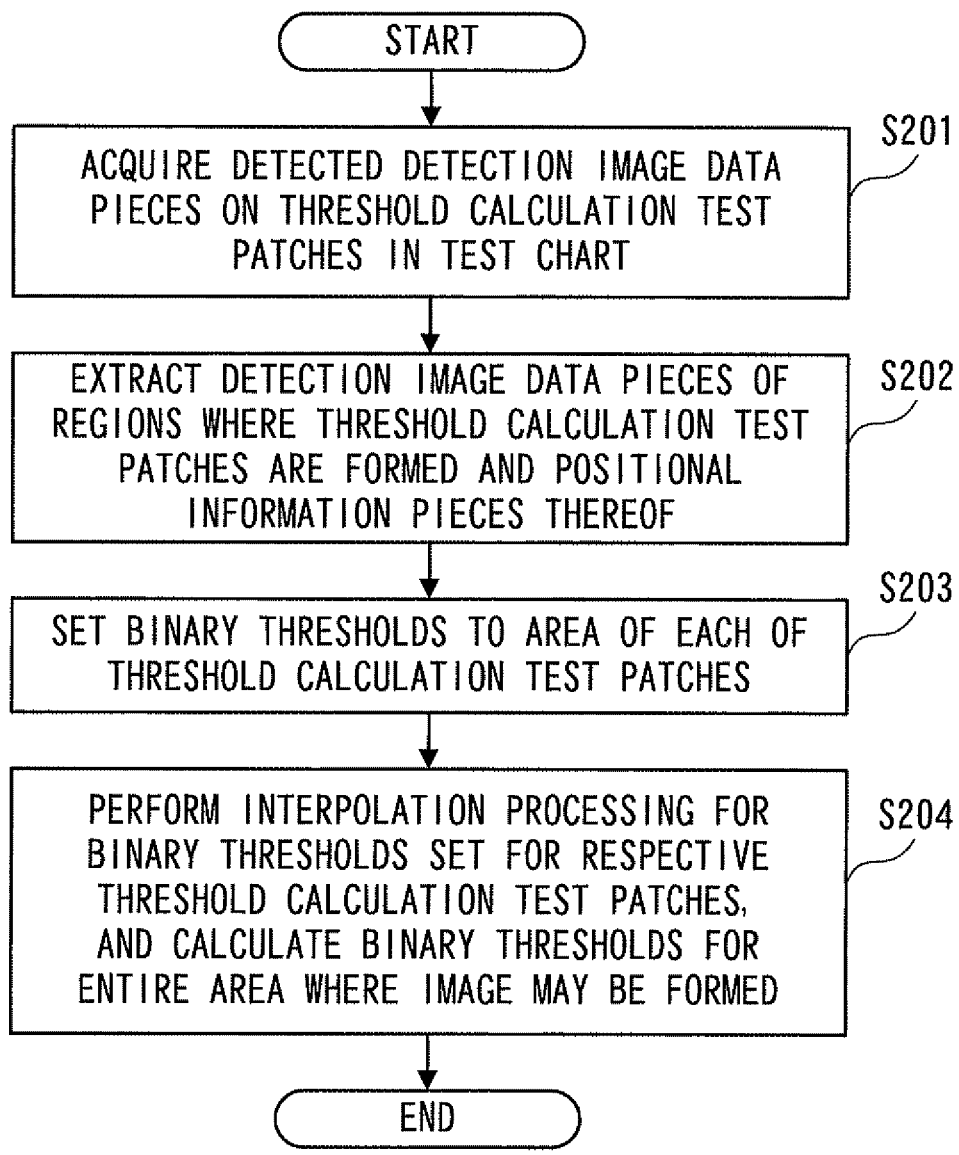
FIG. 13 is a flowchart showing an example of the content of the setting processing for setting the binary thresholds, performed by the fault diagnostic unit.

FIG. 13 is a flowchart showing an example of the content of the setting processing for setting the binary thresholds, performed by the fault diagnostic unit 20.

As shown in FIG. 13, the fault diagnostic unit 20 acquires the detected detection image data pieces on the threshold calculation test patches in the test chart including the threshold calculation test patches and the defect diagnosis test target image formed thereon (Step 201). Then, the fault diagnostic unit 20 extracts the detection image data pieces of the regions (partial regions) where the threshold calculation test patches are formed and the positional information pieces thereof, from the acquired detection image data pieces on the threshold calculation test patches (Step 202).

Thereafter, the fault diagnostic unit 20 sets the binary thresholds for judging whether or not an image defect occurs, on the basis of each ratio of the cumulative value of the area of the region including pixels having a detection tone density value larger than the binary threshold (detection area) to the area of each of the threshold calculation test patches (detection area ratio) (Step 203).

The fault diagnostic unit 20 performs interpolation processing for the binary thresholds set for the respective threshold calculation test patches, and further calculates the binary thresholds for the entire area where an image may be formed (Step 204).

Note that, in the present exemplary embodiment, the test chart including the threshold calculation test patches and the defect diagnosis test target image formed on one sheet is used. Instead of using such a configuration of the test chart, a test chart including the threshold calculation test patches (threshold calculation test chart) and a test chart including the defect diagnosis test target image (defect diagnosis test chart), which are individually formed on different sheets, may be used.

In such a case, upon the selection of a test chart by a user on the basis of the occurrence state of the image defect, the image forming part 40 prints the "threshold calculation test chart" and the "defect diagnosis test chart" corresponding to the test chart selected by the user, in sequence. Further, the controller 10 firstly causes the operation display 50 to display an instruction to instruct the user to operate the image scanner part 60 to scan the "threshold calculation test chart" (threshold calculation test target image). Upon the scanning of the "threshold calculation test chart" by the image scanner part 60, the controller 10 causes the operation display 50 to display an instruction to instructs the user to operate the image scanner part 60 to scan the "defect diagnosis test chart."

As mentioned above, in the image forming apparatus 1 according to the present exemplary embodiment, the binary thresholds, specified for the image density, for judging whether or not an image defect occurs are set for the respective partial regions within the image region, in accordance with variation in density inherent in each image forming apparatus 1. Thereby, influence of the variation in density inherent in each image forming apparatus 1 is reduced, and thus detection accuracy for detecting the image defect is increased.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image defect diagnostic system comprising:
   a memory that stores an image density threshold set for each of partial regions in a test target image being a test target for an image defect and set as a criteria for judging whether or not each of the partial regions has an image defect, and that stores a positional information piece indicating a position of corresponding one of the partial regions in the test target image, while associating the image density threshold and the positional information piece with each other;
   a diagnostic unit that compares an image data piece of each of the partial regions generated by scanning the test target image with the image density threshold set for corresponding one of the partial regions stored in the memory, to diagnose whether or not an image defect occurs in the test target image;
   an image scanner unit that scans a threshold calculation image for calculating the image density threshold to be stored in the memory, and that detects tone density values of pixels forming the threshold calculation image; and
   a threshold setting unit that sets, as the image density threshold for the threshold calculation image, one tone density value obtained at a time when, by using the one tone density value as a variable, a ratio of an area occupied by a region formed of pixels each having a tone density value not less than the one tone density value to an area of the threshold calculation image becomes a value set in advance, the pixels forming the threshold calculation image scanned by the image scanner unit.

2. The image defect diagnostic system according to claim 1, wherein
   the memory stores the image density threshold while associating the image density threshold with a corresponding positional information piece on a position of each of the partial regions in a first scan direction in the test target image, each of the partial regions having the image density threshold thus set, and
   the diagnostic unit compares the image data piece of each of the partial regions with the image density threshold that is stored in the memory and that is associated with the position of corresponding one of the partial regions in the first scan direction, to diagnose whether or not an image defect occurs in the test target image.

3. The image defect diagnostic system according to claim 1, wherein the threshold calculation image to be scanned by the image scanner unit is arrayed in a first scan direction in the test target image.

4. An image forming apparatus comprising:
   an image forming unit that forms, on a recording medium, a test target image being a test target for an image defect;
   an image scanner unit that scans the test target image formed by the image forming unit, and that generates image data on the test target image; and
   an image defect diagnostic unit that diagnoses an image defect occurring in the test target image by using the image data generated by the image scanner unit, wherein
   the image defect diagnostic unit includes:
      a memory that stores an image density threshold set for each of partial regions in the test target image and set as a criteria for judging whether or not each of the partial regions has an image defect, and that stores a positional information piece indicating a position of corresponding one of the partial regions in the test target image, while associating the image density threshold and the positional information piece with each other;
      a diagnostic unit that compares an image data piece of each of the partial regions in the image data generated by scanning the test target image with the image density threshold set for corresponding one of the partial regions stored in the memory, to diagnose whether or not an image defect occurs in the test target image;
   the image scanner unit that scans a threshold calculation image for calculating the image density threshold to be stored in the memory, and that detects tone density values of pixels forming the threshold calculation image; and
   a threshold setting unit that sets, as the image density threshold for the threshold calculation image, one tone density value obtained at a time when, by using the one tone density value as a variable, a ratio of an area occupied by a region formed of pixels each having a tone density value not less than the one tone density value to an area of the threshold calculation image becomes a value set in advance, the pixels forming the threshold calculation image scanned by the image scanner unit.

5. The image forming apparatus according to claim 4, further comprising a receiving unit that receives an input of an instruction about diagnosis of an image defect from a user, wherein
   the image forming unit forms the test target image by the reception of the input of the instruction about the diagnosis by the receiving unit,
   the image scanner unit generates the image data on the test target image formed by the image forming unit, and
   the image defect diagnostic unit compares the image data piece of each of the partial regions in the image data on the test target image generated by the image scanner unit with the image density threshold set for corresponding one of the partial regions in the test target image, to diagnose whether or not an image defect occurs in the test target image.

6. The image forming apparatus according to claim 4, wherein
   the memory of the image defect diagnostic unit stores the image density threshold while associating the image density threshold with a corresponding positional information piece on a position of each of the partial regions in a first scan direction in the test target image, each of the partial regions having the image density threshold thus set, and
   the diagnostic unit of the image defect diagnostic unit compares the image data piece of each of the partial regions with the image density threshold that is stored in the memory and that is associated with the position of corresponding one of the partial regions in the first scan direction, to diagnose whether or not an image defect occurs in the test target image.

7. The image forming apparatus according to claim 4, wherein
   the image forming unit forms the test target image including a plurality of threshold calculation images that are arrayed in a first scan direction at any one of a position and positions in a slow scan direction on a recording medium, and that are each used for calculating the image density threshold to be stored in the memory of the image defect diagnostic unit.

8. The image forming apparatus according to claim 4, wherein the image forming unit sequentially forms a threshold calculation test target image formed of a plurality of threshold calculation images and the test target image being a test target for an image defect, the plurality of threshold calculation images being arrayed in a first scan direction at any one of a position and positions in a slow scan direction on a recording medium, and each being used for calculating the image density threshold to be stored in the memory of the image defect diagnostic unit, and the image forming apparatus further includes an instruction unit that instructs a user to operate the image scanner unit to scan the test target image after the image scanner unit scans the threshold calculation test target image.

9. An image defect diagnostic method comprising:

acquiring image data on a test target image generated by scanning the test target image being a test target for an image defect using an image scanner unit;

comparing an image data piece of each of partial regions in the image data on the test target image thus acquired with an image density threshold set for corresponding one of the partial regions as a criteria for judging whether or not each of the partial regions has an image defect, to diagnose whether or not an image defect occurs in the test target image;

scanning a threshold calculation image using the image scanner unit for calculating the image density threshold to be stored in the memory, and detecting tone density values of pixels forming the threshold calculation image; and setting, as the image density threshold for the threshold calculation image, one tone density value obtained at a time when, by using the one tone density value as a variable, a ratio of an area occupied by a region formed of pixels each having a tone density value not less than the one tone density value to an area of the threshold calculation image becomes a value set in advance, the pixels forming the threshold calculation image scanned by the image scanner unit.

10. A non-transitory computer readable medium storing a program causing a computer to execute a process for improving detection accuracy of image defects, the process comprising:

acquiring image data on a test target image generated by scanning the test target image being a test target for an image defect;

comparing an image data piece of each of partial regions in the image data on the test target image thus acquired with an image density threshold set for corresponding one of the partial regions as a criteria for judging whether or not each of the partial regions has an image defect, to diagnose whether or not an image defect occurs in the test target image;

scanning a threshold calculation image using an image scanner unit for calculating the image density threshold to be stored in the memory, and that detects tone density values of pixels forming the threshold calculation image; and a threshold setting unit that sets, as the image density threshold for the threshold calculation image, one tone density value obtained at a time when, by using the one tone density value as a variable, a ratio of an area occupied by a region formed of pixels each having a tone density value not less than the one tone density value to an area of the threshold calculation image becomes a value set in advance, the pixels forming the threshold calculation image scanned by the image scanner unit.

11. The non-transitory computer readable medium storing a program according to claim 10, wherein the process further comprises acquiring the image density threshold set for each of the partial regions from a memory that stores the image density threshold and a corresponding positional information piece of each of the partial regions in the test target image while associating the image density threshold and the positional information pieces with each other.

\* \* \* \* \*